(12) United States Patent
Jaradi et al.

(10) Patent No.: US 11,518,221 B2
(45) Date of Patent: Dec. 6, 2022

(54) CABLE REINFORCEMENT FOR VEHICLE DOORS

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Saeed D. Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 17/210,879

(22) Filed: Mar. 24, 2021

(65) Prior Publication Data

US 2022/0305887 A1 Sep. 29, 2022

(51) Int. Cl.
*B60J 5/04* (2006.01)
(52) U.S. Cl.
CPC ............. *B60J 5/044* (2013.01); *B60J 5/0437* (2013.01)
(58) Field of Classification Search
CPC ........ B60J 5/044; B60J 5/0437; B60J 5/0455; B60J 5/0456; B60J 5/042; B60J 5/0422; B60J 5/0443
USPC .......................................... 296/146.6, 187.12
See application file for complete search history.

(56) References Cited

U.S. PATENT DOCUMENTS

| 5,431,476 A * | 7/1995 | Torigaki ................. B60J 5/0427 296/202 |
| 5,800,007 A * | 9/1998 | Cho ....................... B62D 25/04 49/503 |
| 6,220,652 B1 * | 4/2001 | Browne ................... B60J 5/044 49/502 |
| 7,331,626 B2 | 2/2008 | Yoshimoto et al. |
| 7,354,083 B1 | 4/2008 | Obermann |
| 10,487,553 B2 | 11/2019 | Iacovoni et al. |

FOREIGN PATENT DOCUMENTS

| KR | 1626720 B1 * | 6/2016 | ............ B60J 5/0437 |
| WO | 2020108859 A1 | 6/2020 | |
| WO | 2020109493 A1 | 6/2020 | |

\* cited by examiner

*Primary Examiner* — Joseph D. Pape
*Assistant Examiner* — Veronica M Shull
(74) *Attorney, Agent, or Firm* — Frank A. MacKenzie; Bejin Bieneman PLC

(57) ABSTRACT

A vehicle includes a front door and a rear door. A first bracket is fixed to the front door, and a second bracket is fixed to the rear door. A front cable extends from the first bracket away from the second bracket along a vehicle-longitudinal axis. A rear cable extends from the second bracket away from the first bracket along the vehicle-longitudinal axis. A linear actuator is fixed to one of the first bracket or the second bracket and is extendable to the other of the first bracket or the second bracket.

20 Claims, 5 Drawing Sheets

CABLE REINFORCEMENT FOR VEHICLE DOORS

BACKGROUND

Vehicles may be subject to crash tests. Vehicle structural performance and occupant injury values are assessed using standardized protocols in these crash tests. Such tests may be standardized by various governmental or industry organizations. Some test, for example, measure the door intrusion and/or the movement of vehicle occupants during vehicle impacts that move the vehicle occupants in cross-vehicle directions. These tests include side impact tests and oblique impact tests. For example, FMVSS 214 mandates static door intrusion requirement and dynamic impact limits on occupants of a vehicle. Some public domain organizations such as IIHS also test for kinematic control of occupants during dynamic side impacts.

DETAILED DESCRIPTION

Figure 1:
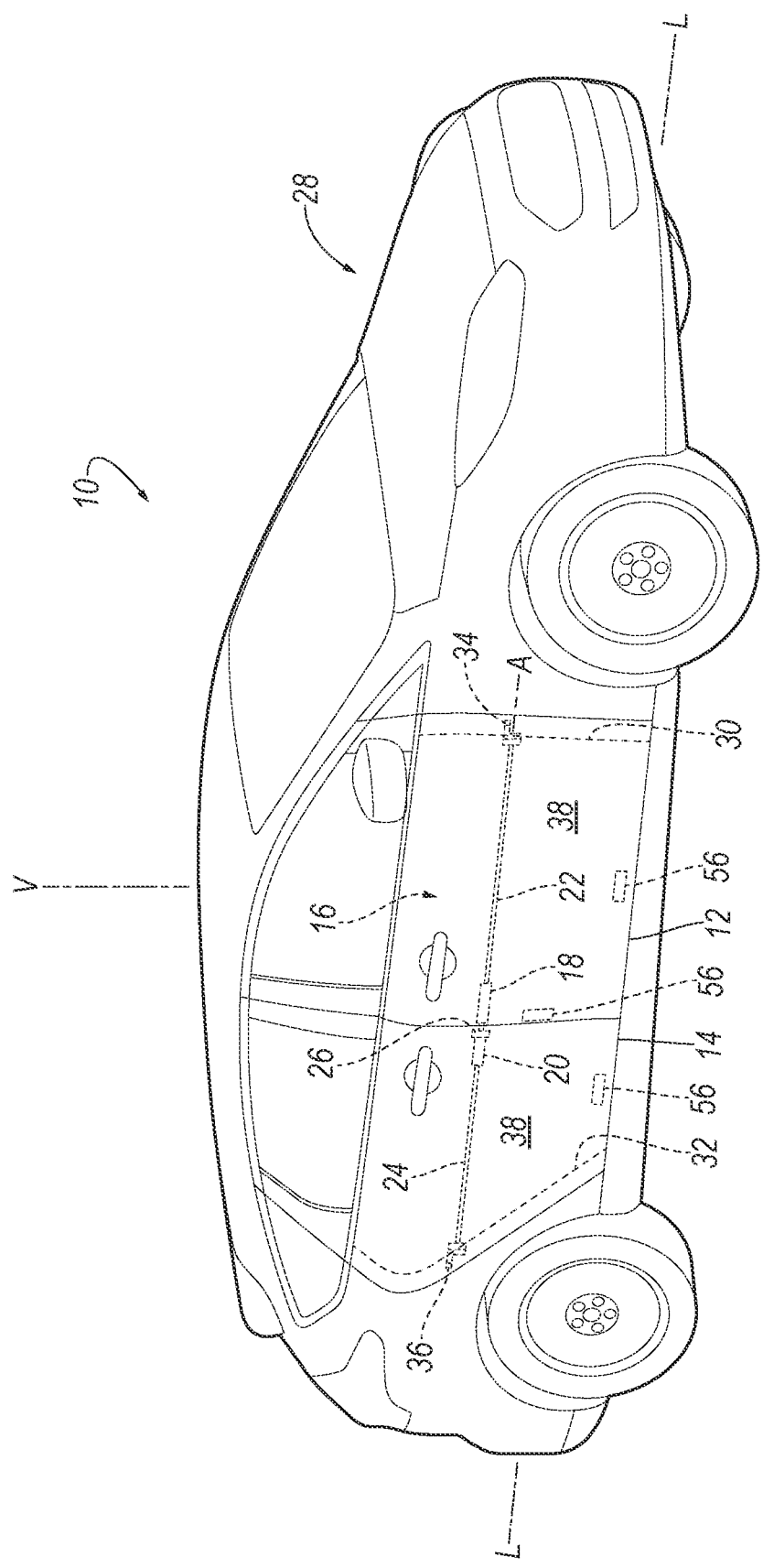
FIG. 1 is a perspective view of a vehicle including an exemplary reinforcement system for a front door and a rear door shown in hidden lines.

A vehicle includes a front door and a rear door. A first bracket is fixed to the front door, and a second bracket is fixed to the rear door. A front cable extends from the first bracket away from the second bracket along a vehicle-longitudinal axis. A rear cable extends from the second bracket away from the first bracket along the vehicle-longitudinal axis. A linear actuator is fixed to one of the first bracket or the second bracket and is extendable to the other of the first bracket or the second bracket.

The linear actuator may be configured to threadedly engage the other of the first bracket or the second bracket.

When the linear actuator is engaged with the other of the first bracket or the second bracket, the front cable and the rear cable may be under tension.

When the linear actuator is disengaged with the other of the first bracket or the second bracket, tension in the front cable and/or the rear cable may be relaxed relative to the tension when the linear actuator is engaged with the other of the first bracket or the second bracket.

The vehicle may include a computer having a processor and a memory storing instructions executable by the processor to control actuation of the linear actuator based on determining whether at least one of the front door or the rear door is open. The instructions may further include instructions to control actuation of the linear actuator additionally based on determining whether a transmission is engaged in a park gear.

The linear actuator may be positioned to extend along an axis generally parallel to the vehicle-longitudinal axis.

The front cable may extend across the front door, and the rear cable may extend across the rear door.

The front door may include a front hinge spaced from the first bracket, and the rear door may include a rear hinge spaced from the second bracket. The front cable may be connected to the first bracket and the front hinge, and the rear cable may be connected to the second bracket and the rear hinge.

The front hinge and the first bracket may be generally aligned with each other along a vertical axis, and the rear hinge and the second bracket may be generally aligned with each other along the vertical axis.

The first bracket and the second bracket may be generally aligned with each other along the vertical axis.

The front cable and the rear cable may be generally parallel to each other.

The vehicle may include a third bracket fixed to the front door and spaced from the first bracket along a vertical axis. The vehicle may include a fourth bracket fixed to the rear door and spaced from the second bracket along the vertical axis. The vehicle may include a lower front cable extending from the third bracket away from the fourth bracket along the vehicle-longitudinal axis. The vehicle may include a lower rear cable extending from the fourth bracket away from the third bracket along the vehicle-longitudinal axis. The vehicle may include a second linear actuator fixed to one of the third bracket or the fourth bracket and being extendable to the other of the third bracket or the fourth bracket.

The front cable and the lower front cable may be generally parallel to each other, and the rear cable and the lower rear cable may be generally parallel to each other.

The front cable and the rear cable may be generally parallel to each other.

The vehicle may include a front reinforcement cable extending from the front cable to the lower front cable, and a rear reinforcement cable extending from the rear cable to the lower rear cable.

The front reinforcement cable may extend oblique to the front cable and the lower front cable, and the rear reinforcement cable may extend oblique to the rear cable and the lower rear cable.

The front door may include front hinges, and the rear door may include rear hinges. The front cable and the lower front cable each may be connected to one respective front hinge, and the rear cable and the lower rear cable each may be connected to one respective rear hinge.

The front cable and the lower front cable both may extend across the front door, and the rear cable and the lower rear cable both may extend across the rear door.

The linear actuator may be positioned to be extendable along an axis generally parallel to the vehicle-longitudinal axis, and the second linear actuator may be positioned to be extendable along a second axis generally parallel to the vehicle-longitudinal axis.

With reference to the Figures, wherein like numerals indicate like parts throughout the several views, a vehicle 10 is generally shown. The vehicle 10 includes a front door 12 and a rear door 14. The vehicle 10 includes a reinforcement system 16 having a first bracket 18 fixed to the front door 12 and a second bracket 20 fixed to the rear door 14. A front cable 22 extends from the first bracket 18 away from the second bracket 20 along a vehicle-longitudinal axis L. A rear cable 24 extends from the second bracket 20 away from the first bracket 18 along the vehicle-longitudinal axis L. A linear actuator 26 is fixed to one of the first bracket 18 or the second bracket 20 and is extendable to the other of the first bracket 18 or the second bracket 20.

The vehicle 10 may have a B-pillarless configuration. In other words, the vehicle 10 does not include a pillar between the front door 12 and the rear door 14. In this situation, the front door 12 is hinged at a vehicle-forward end of the front door 12 and the rear door 14 is hinged at a vehicle-rearward end of the rear door 14. Since the front cable 22 extends across the front door 12 and the rear cable 24 extends across the rear door 14, activation of the linear actuator 26 connects the front and rear cables 22, 24. During a side impact, the front and rear cables 22, 24 can distribute a force from the side impact along the front and rear doors 12, 14. Specifically, the front and rear cables 22, 24 and distribute the force to a body 28 of the vehicle 10, and specifically to a front pillar 30 and a rear pillar 32. Distributing the force to the body 28 of the vehicle 10 provides reinforcement to the front and rear doors 12, 14 in the B-pillarless configuration of the vehicle 10. Additionally, using a linear actuator 26 to connect the front and rear cables 22, 24 can satisfy packaging constraints within the front and rear doors 12, 14 and can allow tension in the front and/or rear cable 22, 24 to be adjusted, as discussed below.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a frame (not numbered) and the body 28. The frame may be of a unibody construction in which the frame is unitary with the body 28 (including frame rails, pillars 30, 32, roof rails, etc.). As another example, the body 28 and frame may have a body-on-frame construction (also referred to as a cab-on-frame construction) in which the body 28 and frame are separate components, i.e., are modular, and the body 28 is supported on and affixed to the frame. Alternatively, the frame and body may have any suitable construction. The frame and body may be of any suitable material, for example, steel, aluminum, and/or fiber-reinforced plastic, etc.

The body 28 defines a passenger compartment (not numbered) to house occupants, if any, of the vehicle 10. The vehicle 10 includes one or more seats (not shown). The vehicle 10 may include any suitable number of seats. The seats may be arranged in the passenger cabin in any suitable position, i.e., as front seats, rear seats, third-row seats, etc. The seats may be movable relative to the floor to various positions, e.g., movable fore-and-aft and/or cross-vehicle. The seats may be of any suitable type, e.g., a bucket seat.

As set forth above, the vehicle 10 may be B-pillarless, as shown in FIG. 1. Specifically, the body 28 may be B-pillarless. In such an example, the body 28 may define one door opening that receives two doors, e.g., the front door 12 and the rear door 14. The front door 12 is hinged at the vehicle-forward end of the front door 12 to the front pillar 30 of the body 28. For example, the front door 12 may include front hinges 34 that couple the front door 12 to the front pillar 30. The rear door 14 is hinged at the vehicle-rearward end of the rear door 14 to the rear pillar 32 of the body 28. For example, the rear door 14 may include rear hinges 36 that couple the rear door 14 to the rear pillar 32. The body 28 does not include a pillar between the front pillar 30 and the rear pillar 32. The doors 14 meet at a location between the front pillar 30 and the rear pillar 32 and may releasably latch to each other.

The doors 12, 14 of the vehicle 10 are pivotable, e.g., to open and close, for occupants to enter and exit the passenger compartment. The front hinges 34 permit the front door 12 to pivot relative to the front pillar 30 and the rear hinges 36 permit the rear door 14 to pivot relative to the rear pillar 32.

Each door 12, 14 includes at least one door panel, e.g., an inner panel 40 (also referred to as a "door inner") and an outer panel 38 (also referred to as a door outer"). The outer panel 38 is fixed relative to the inner panel 40. The outer panel 38 is outboard relative to the inner panel 40. The outer panel 38 faces outboard relative to the vehicle 10. The outer panel 38 may present a class-A surface, i.e., a surface specifically manufactured to have a high-quality, finished aesthetic appearance free of blemishes. The outer panel 38 may be metal (such as steel, aluminum, etc.) or polymeric (such as fiber reinforced plastic composite, etc.). The inner panel 40 may be metal (such as steel, aluminum, etc.) or polymeric (such as fiber reinforced plastic composite, etc.). The inner panel 40 provides structural rigidity for the outer panel 38. The outer panel 38 may provide a mounting location for components of the door 12, 14.

With continued reference to FIG. 1, each door 12, 14 and the body 28, e.g., a rocker, may include a latching assembly 56 for latching the respective door 12, 14 to the body 28. For example, the latching assembly 56 may include a striker on the body 28 and a latch on the door 12, 14 that releasably engages the striker. In the example shown in FIG. 1, the vehicle 10 with the B-pillarless configuration includes a latching assembly 56 for both the front door 12 and the rear door 14. Additionally, the doors 12, 14 may include a latching assembly 56 for latching the doors 12, 14 to each other. For example, the latching assembly 56 may include a striker on one door 12, 14 and a latch on the other door 12, 14 that releasably engages the striker.

Figure 2A:
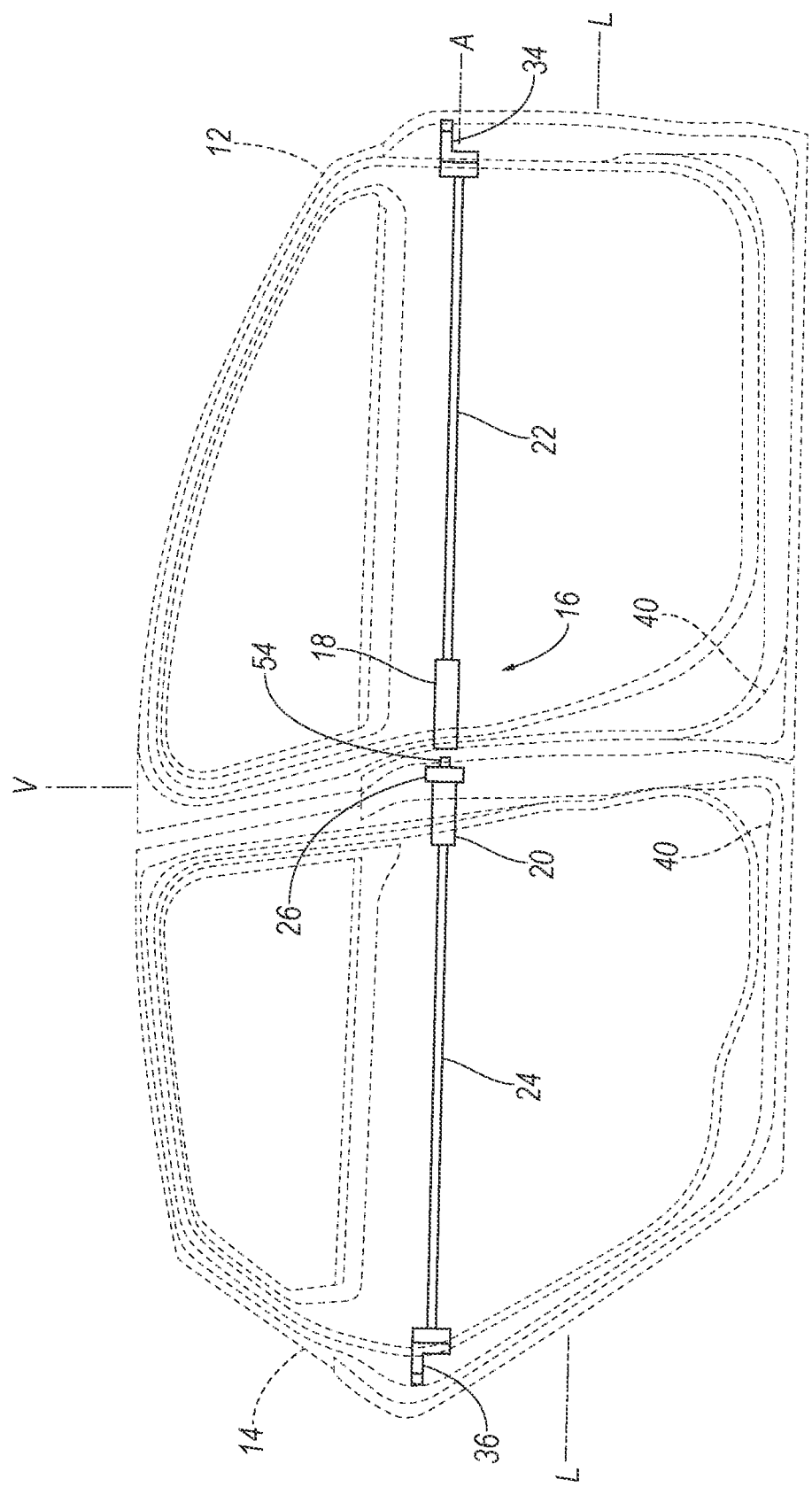
FIG. 2A is a side view of an inner panel of the front and rear doors and a linear actuator in a disengaged position.
Figure 2B:
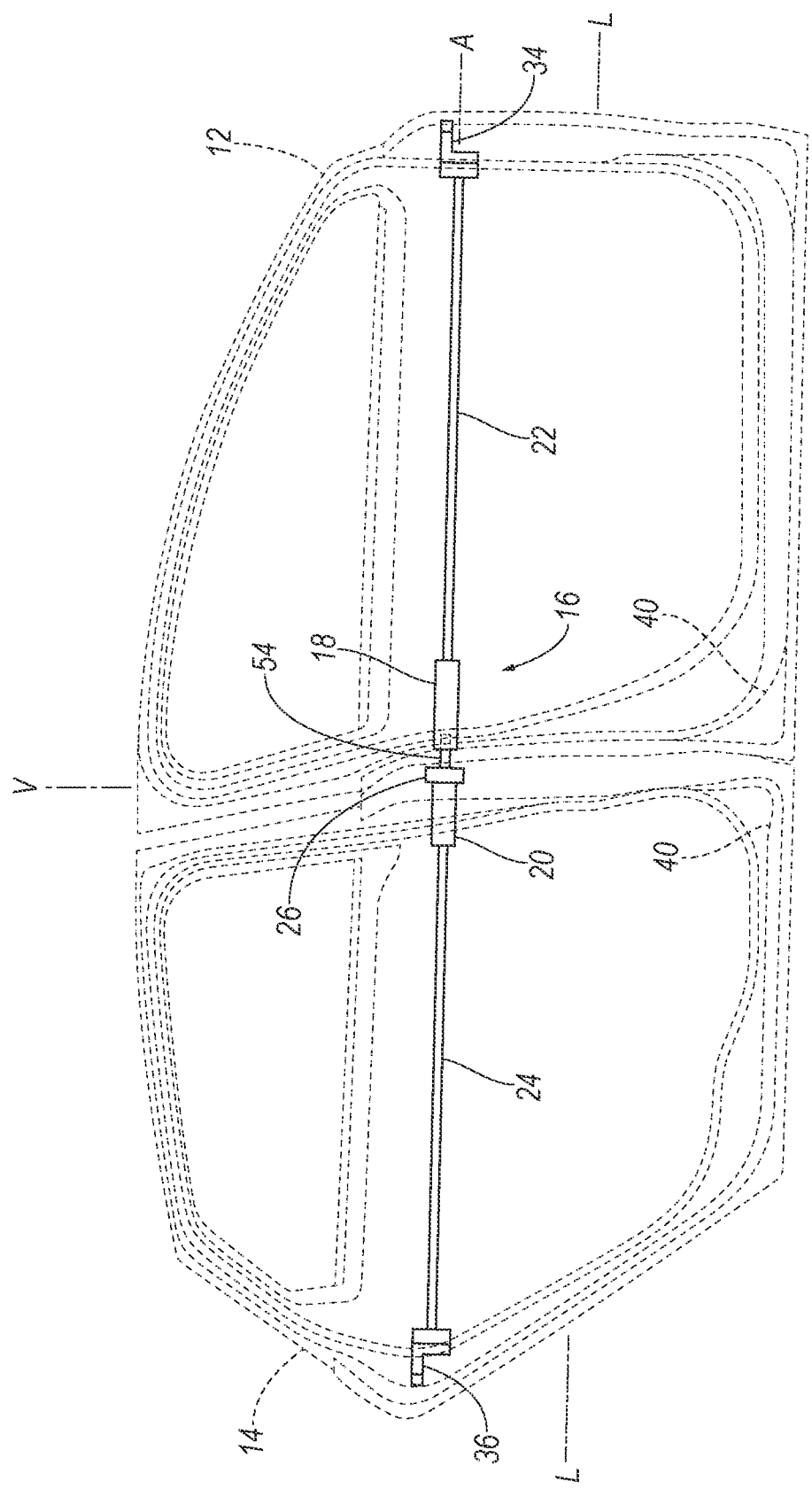
FIG. 2B is a side view of the inner panel with the linear actuator in an engaged position.

With reference to FIGS. 1-2B, the reinforcement system 16 may be concealed by the doors 12, 14, i.e., not visible to an occupant during ingress, egress, and occupancy of the vehicle 10. Specifically, the first bracket 18 and the front cable 22 are between the inner panel 40 and the outer panel 38 of the front door 12, and the second bracket 20 and the rear cable 24 are between the inner panel 40 and the outer panel 38 of the rear door 14.

The first bracket 18 is disposed at a vehicle-rearward end of the front door 12. That is, the first bracket 18 is spaced from the front hinges 34 along the vehicle-longitudinal axis L. The first bracket 18 may be generally aligned with one of the front hinges 34 along a vertical axis V. In this context, "generally" means that an axis extending from the first bracket 18 to one front hinge 34 extends generally along the vehicle-longitudinal axis L, even if the axis deviates from parallel. The first bracket 18 may include a feature for threadedly engaging the front cable 22, e.g., a weld nut. The first bracket 18 may, for example, be mounted to the outer panel 38 of the front door 12, as shown in the Figures. As another example, the first bracket 18 may be mounted to the inner panel 40 of the front door 12. The first bracket 18 may be fixed to the front door 12 in any suitable manner, e.g., fasteners, welding, etc.

The second bracket 20 is disposed at a vehicle-forward end of the rear door 14. That is, the second bracket 20 is spaced from the rear hinges 36 along the vehicle-longitudinal axis L. The second bracket 20 may be generally aligned with one of the rear hinges 36 along the vertical axis V. Additionally, the second bracket 20 may be generally aligned with the first bracket 18 along the vertical axis V. The second bracket 20 may be substantially identical to the first bracket 18 and may be fixed to the rear door 14 in a same manner as the first bracket 18 is fixed to the front door 12.

As set forth above, the front cable 22 extends from the first bracket 18 away from the second bracket 20 along the vehicle-longitudinal axis L. Specifically, the front cable 22 extends across the front door 12. That is, the front cable 22 extends from the vehicle-forward end of the front door 12 to the vehicle-rearward end of the front door 12. The front cable 22 may be elongated along an axis A parallel to the vehicle-longitudinal axis L.

The front cable 22 includes one end (not numbered) connected to the first bracket 18 and another end spaced from the one end. For example, the one end may be threaded and threadedly engaged with the first bracket 18, e.g., via the weld nut. Alternatively, the one end may be connected directly, or indirectly via one or more intermediate components, to the first bracket 18 via fasteners, welding etc.

The other end is disposed at the vehicle-forward end of the front door 12. The ends of the front cable 22 may be generally aligned with each other relative to the vertical axis V. The other end is fixed relative to the front door 12. For example, the other end may be connected to one front hinge 34. For example, one front hinge 34 may include a feature for threadedly engaging the other end of the front cable 22, e.g., a weld nut. In this situation, the other end of the front cable 22 may be threaded and threadedly engaged with the one front hinge 34. Alternatively, the other end may be connected directly, or indirectly via one or more intermediate components, to the one front hinge 34 via fasteners, welding etc.

As set forth above, the rear cable 24 extends from the second bracket 20 away from the first bracket 18 along the vehicle-longitudinal axis L. Specifically, the rear cable 24 extends across the rear door 14. That is, the rear cable 24 extends from the vehicle-forward end of the rear door 14 to the vehicle-rearward end of the rear door 14. The rear cable 24 may be elongated along the axis A parallel to the vehicle-longitudinal axis L. That is, the front and rear cables 22, 24 may be generally parallel to each other.

The rear cable 24 includes one end (not numbered) connected to the second bracket 20, e.g., in substantially the same manner as discussed above in regards to the one end of the front cable 22 being connected to the first bracket 18.

The rear cable 24 includes another end (not numbered) spaced from the one end. The other end is disposed at the vehicle-rearward end of the rear door 14. The ends of the rear cable 24 may be generally aligned with each other relative to the vertical axis V. The other end is fixed relative to the rear door 14. For example, the other end may be connected to one rear hinge 36, e.g., in substantially the same manner as discussed above in regards to the other end of the front cable 22 being connected to one front hinge 34.

The front and rear cables 22, 24 are designed, i.e., sized and shaped, to oppose door intrusion during a vehicle side impact. The front and rear cables 22, 24 may, for example, include several strands of wire that are bonded, twisted, and/or braided together into the shape of a helix. The front and rear cables 22, 24 may be designed to have a high tensile strength for transferring heavy loads between the front and rear pillars 30, 32. The front and rear cables 22, 24 may have any suitable diameter. The front and rear cables 22, 24 may have a same or different diameter. The front and rear cables 22, 24 may be made of any suitable material such as metal, etc. The front and rear cables 22, 24 may be made of a same or different material.

Figure 4:
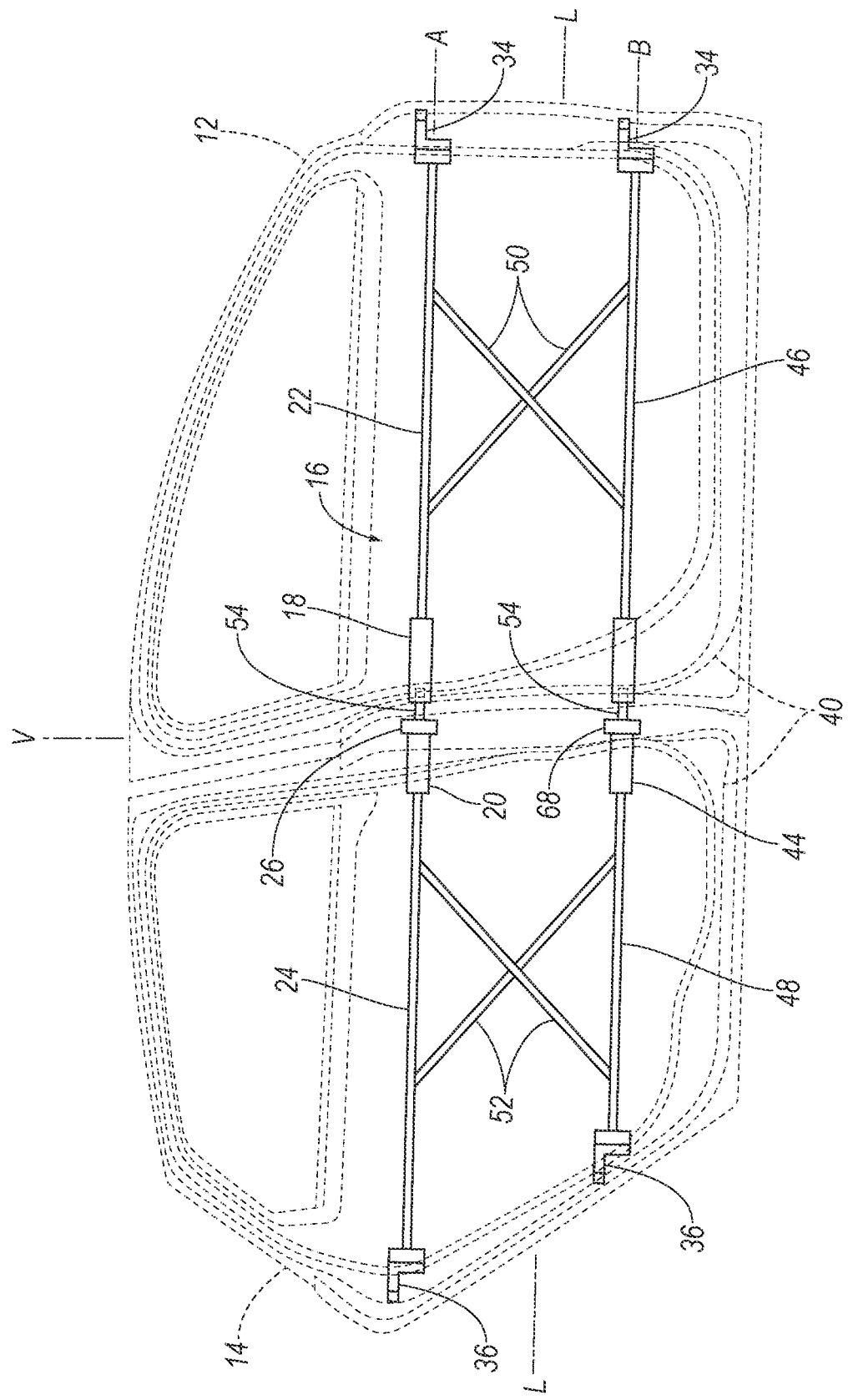
FIG. 4 is a side view of the inner panel with another exemplary reinforcement system.

With reference to FIG. 4, the reinforcement system 16 may include a third bracket 42 and a fourth bracket 44. The third bracket 42 may be disposed at the vehicle-rearward end of the front door 12. That is, the third bracket 42 may be spaced from the front hinges 34 along the vehicle-longitudinal axis L. The third bracket 42 may be spaced from the first bracket 18 along the vertical axis V. For example, the third bracket 42 may be disposed between the rocker and the first bracket 18 relative to the vertical axis V. The third bracket 42 may be generally aligned with the other of the front hinges 34 along the vertical axis V. The third bracket 42 may be substantially identical to the first bracket 18 and may be fixed to the front door 12 in a same manner as the first bracket 18.

The fourth bracket 44 may be disposed at the vehicle-forward end of the rear door 14. That is, the fourth bracket 44 may be spaced from the rear hinges 36 along the vehicle-longitudinal axis L. The fourth bracket 44 may be spaced from the second bracket 20 along the vertical axis V. For example, the fourth bracket 44 may be disposed between the rocker and the second bracket 20 relative to the vertical axis V. The fourth bracket 44 may be generally aligned with the other of the rear hinges 36 along the vertical axis V. Additionally, the fourth bracket 44 may be generally aligned with the third bracket 42 along the vertical axis V. The fourth bracket 44 may be substantially identical to the second bracket 20 and may be fixed to the rear door 14 in a same manner as the second bracket 20.

Additionally, the reinforcement system 16 may include a lower front cable 46 and a lower rear cable 48. The lower front cable 46 and the lower rear cable 48 may be substantially identical to the front and rear cables 22, 24.

The lower front cable 46 may extend from the third bracket 42 away from the fourth bracket 44 along the vehicle-longitudinal axis L. Specifically, the lower front cable 46 may extend across the front door 12. That is, the lower front cable 46 may extend from the vehicle-forward end of the front door 12 to the vehicle-rearward end of the front door 12. The lower front cable 46 may be elongated along a second axis B parallel to the vehicle-longitudinal axis L. That is, the lower front cable 46 may be generally parallel to the front and rear cables 22, 24.

The lower front cable 46 may include one end (not numbered) connected to the third bracket 42, e.g., in substantially the same manner as discussed above in regards to the one end of the front cable 22 being connected to the first bracket 18.

The lower front cable 46 may include another end (not numbered) spaced from the one end. The other end may be disposed at the vehicle-forward end of the front door 12. The ends of the lower front cable 46 may be generally aligned with each other relative to the vertical axis V. The other end may be fixed relative to the front door 12. For example, the other end may be connected to the other front hinge 34, e.g., in substantially the same manner as discussed above in regards to the one end of the front cable 22 being connected to the one front hinge 34. That is, the front cable 22 and the lower front cable 46 each may be connected to one respective front hinge 34.

The lower rear cable 48 may extend from the fourth bracket 44 away from the fourth bracket 44 along the vehicle-longitudinal axis L. Specifically, the lower rear cable 48 may extend across the rear door 14. That is, the lower rear cable 48 may extend from the vehicle-forward end of the rear door 14 to the vehicle-rearward end of the rear door 14. The lower rear cable 48 may be elongated along the second axis B parallel to the vehicle-longitudinal axis L. That is, the lower rear cable 48 may be generally parallel to the lower front cable 46. Additionally, the lower rear cable 48 may be generally parallel to the front cable 22 and the rear cable 24.

The lower rear cable 48 may include one end (not numbered) connected to the fourth bracket 44, e.g., in substantially the same manner as discussed above in regards to the one end of the rear cable 24 being connected to the second bracket 20.

The lower rear cable 48 may include another end (not numbered) spaced from the one end. The other end may be disposed at the vehicle-rearward end of the rear door 14. The ends of the lower rear cable 48 may be generally aligned with each other relative to the vertical axis V. The other end may be fixed relative to the rear door 14. For example, the other end may be connected to the other rear hinge 36, e.g., in substantially the same manner as discussed above in regards to the one end of the rear cable 24 being connected to the one rear hinge 36. That is, the rear cable 24 and the lower rear cable 48 each may be connected to on respective rear hinge 36.

With continued reference to FIG. 4, in an example in which the reinforcement system 16 includes the lower front cable 46 and the lower rear cable 48, the reinforcement system 16 may include a front reinforcement cable 50 and a rear reinforcement cable 52. The front reinforcement cable 50 and the rear reinforcement cable 52 may be substantially identical to the front cable 22, the rear cable 24, the lower front cable 46, and the lower rear cable 48. The reinforcement system 16 may include any suitable number of front and rear reinforcement cables 50, 52. For example, as shown in FIG. 4, the reinforcement system 16 may include two front reinforcement cables 50 and two rear reinforcement cables 52. The reinforcement system 16 may include a same or different number of front and rear reinforcement cables 50, 52.

The front reinforcement cable 50 may extend from the front cable 22 to the lower front cable 46. The front reinforcement cable 50 may extend oblique, i.e., neither parallel nor perpendicular, to the front cable 22 and the lower front cable 46. The front reinforcement cable 50 may include one end (not numbered) connected to the front cable 22 and another end (not numbered) connected to the lower front cable 46. The one end may be disposed between, i.e., spaced from, the ends of the front cable 22, and the other end may be disposed between, i.e., spaced from, the ends of the lower front cable 46. The front reinforcement cable 50 may be connected to the front cable 22 and the lower front cable 46, e.g., via welding.

The rear reinforcement cable 52 may extend from the rear cable 24 to the lower rear cable 48. The rear reinforcement cable 52 may extend oblique, i.e., neither parallel nor perpendicular, to the rear cable 24 and the lower rear cable 48. The rear reinforcement cable 52 may include one end (not numbered) connected to the rear cable 24 and another end (not numbered)connected to the lower rear cable 48. The one end may be disposed between, i.e., spaced from, the ends of the rear cable 24, and the other end may be disposed between, i.e., spaced from, the ends of the lower rear cable 48. The rear reinforcement cable 52 may be connected to the rear cable 24 and the lower rear cable 48, e.g., via welding.

As shown in the Figures, the linear actuator 26 is fixed to one of the first bracket 18 or the second bracket 20, as set forth above. For example, the linear actuator 26 may be mounted to one of the first bracket 18 or the second bracket 20. For example, the linear actuator 26 may include locating elements, fasteners, etc., that engage the one of the first bracket 18 or the second bracket 20. Additionally, or alternatively, fasteners may engage the linear actuator 26 and the one of the first bracket 18 or the second bracket 20 to mount the linear actuator 26 to the respective bracket 18, 20.

The linear actuator 26 is positioned to extend to the other of the first bracket 18 or the second bracket 20. For example, the linear actuator 26 may be positioned to extend along the axis A generally parallel to the vehicle-longitudinal axis L. The linear actuator 26 may convert rotary motion of an electric motor to linear displacement via screws and/or gears. For example, the linear actuator 26 may include a rod 54. A motor of the linear actuator 26 may be coupled to a gear that engages the rod 54 such that rotation of the gear from torque of the motor moves the rod 54, e.g., towards or away from the other of the first bracket 18 or the second bracket 20 based on a direction of rotation of the motor.

The linear actuator 26 may be configured to threadedly engage the other of the first bracket 18 or the second bracket 20. For example, the rod 54 may include threads and the other of the first bracket 18 or the second bracket 20 may include threads that mesh with the threads of the rod 54. The rod 54 is moveable between an engaged position, as shown in FIGS. 2B and 4, and a disengaged position, as shown in FIG. 2A. In the engaged position, the rod 54 is engaged with the other of the first bracket 18 or the second bracket 20. That is, the threads of the rod 54 are meshed with the threads of the other of the first bracket 18 or the second bracket 20. In the engaged position, the first bracket 18 and the second bracket 20, i.e., the front and rear doors 12, 14, may be locked together. In the disengaged position, the rod 54 is spaced from the other of the first bracket 18 or the second bracket 20. That is, the threads of the rod 54 are disengaged with the threads the other of the first bracket 18 or the second bracket 20. In the disengaged position, the first bracket 18 and the second bracket 20 may be moveable relative to each other, i.e., the front and rear doors 12, 14 may be separately moveable.

In examples in which the reinforcement system 16 includes the third bracket 42 and the fourth bracket 44, the reinforcement system 16 includes a second linear actuator 68 fixed to one of the third bracket 42 or the fourth bracket 44, as shown in FIG. 4. The second linear actuator 68 may be fixed to the one of the third bracket 42 or the fourth bracket 44 in substantially the same manner as discussed above regarding the linear actuator 26. The second linear actuator 68 is positioned to be extendable to the other of the third bracket 42 or the fourth bracket 44. For example, the second linear actuator 68 may be positioned to extend along the second axis B generally parallel to the vehicle-longitudinal axis L. The second linear actuator 68 may be substantially identical to the linear actuator 26, e.g., configured to threadedly engage the other of the third bracket 42 or the fourth bracket 44.

When the linear actuator 26 is engaged with the other of the first bracket 18 or the second bracket 20, the front and rear cables 22, 24 are under tension. For example, when the linear actuator 26 threadedly engages the other of the first bracket 18 or the second bracket 20, the linear actuator 26 may apply a tensile force to the first and second brackets 18, 20, e.g., that acts to pull the first bracket 18 and the second bracket 20 towards each other. The tensile force may be adjusted based on an amount of threaded engagement of the linear actuator 26. For example, increasing the number of threads of the rod 54 that mesh with the threads of the other of the first bracket 18 or the second bracket 20 increases the amount of tensile force. The tension in the front and rear cables 22, 24 may distribute a force applied by an object, e.g., during a vehicle side-impact, to the front and rear pillars 30, 32, which can assist in reducing the likelihood of door intrusion to the passenger cabin.

When the linear actuator 26 is disengaged with the other of the first bracket 18 or the second bracket 20, tension in the front cable 22 and/or the rear cable 24 is relaxed relative to the tension when the linear actuator 26 is engaged with the other of the first bracket 18 or the second bracket 20. For example, when the linear actuator 26 disengages the other of the first bracket 18 or the second bracket 20, the linear actuator 26 releases the tensile force applied to the brackets 18, 20. When the linear actuator 26 is disengaged with the other of the first bracket 18 or the second bracket 20, the front and rear cables 22, 24 may, for example, be under tension. For example, when the linear actuator 26 is disengaged from the other of the first bracket 18 or the second bracket 20, the front cable 22 may be taut with tensile force between the front hinge 34 and the first bracket 18, and the rear cable 24 may be taut with tensile force between the rear hinge 36 and the second bracket 20. As another example, when the linear actuator 26 is disengaged from the other of the first bracket 18 or the second bracket 20, the front and rear cables 22, 24 may be relaxed, i.e., lack sufficient tensile force to be taut between the respective hinge 34, 36 and the respective bracket 18, 20.

In examples in which the reinforcement system 16 includes the lower front cable 46 and the lower rear cable 48, the lower front cable 46 and the lower rear cable 48 are under tension when the second linear actuator 68 is engaged with the other of the third bracket 42 or the fourth bracket 44, as discussed above in regards to the front and rear cables 22, 24. Similarly, the tension in the lower front and lower rear cables 46, 48 may distribute a force applied by an object, e.g., during a vehicle side-impact, to the front and rear pillars 30, 32, which can assist in reducing the likelihood of door intrusion to the passenger cabin. Additionally, when the second linear actuator 68 is disengaged with the other of the third bracket 42 or the fourth bracket 44, tension in the lower front cable 46 and/or the lower rear cable 48 is relaxed relative to the tension when the second linear actuator 68 is engaged with the other of the third bracket 42 or the fourth bracket 44, as discussed above in regards to the front and rear cables 22, 24.

Figure 3:
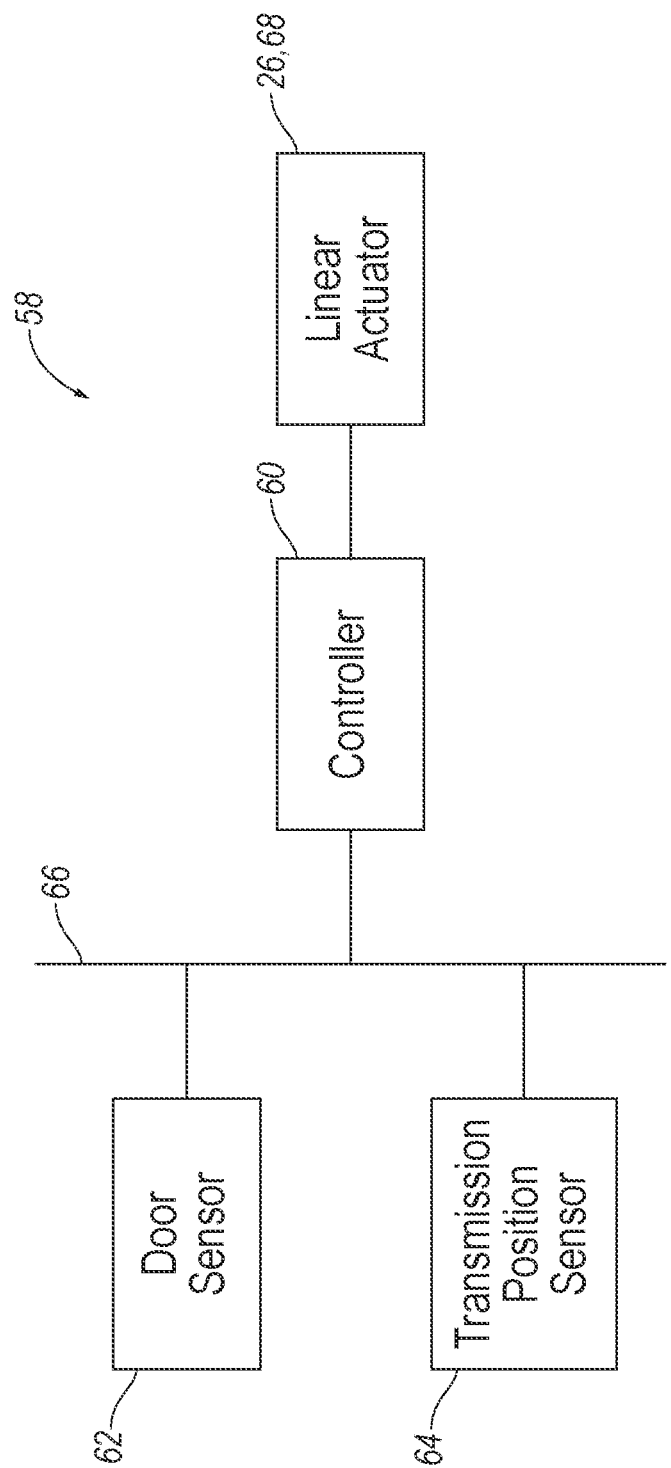
FIG. 3 is a block diagram of a control system for the vehicle.

With reference to FIG. 3, the vehicle 10 may include a control system 58. The control system 58 may include a controller 60, a door sensor 62, a transmission position sensor 64, and the linear actuator 26, in communication through a communication network 66.

The door sensor 62 may be in communication with the controller 60. The door sensor 62 is programmed to detect whether the doors 12, 14 are open or closed. For example, the door sensor 62 may be a button positioned where the doors 12, 14, if closed, will press the button. For another example, the door sensor 62 may be a switch on a latch that is positioned to engage a striker when the door 12, 14 is closed. For another example, the door sensor 62 may be a sensor, e.g., a voltmeter, ammeter, ohmmeter, etc., that registers a value of an electrical variable, e.g., voltage, current, resistance, etc., in an electrical circuit that includes circuit elements in the door 12, 14. Values of the electrical variable corresponding to an open circuit may be classified as the door 12, 14 being open, and values of the electrical variable corresponding to a closed circuit may be classified as the door 12, 14 being closed. One door sensor 62 may be positioned adjacent each door 12, 14. The controller 60 may receive one or more signals from the door sensors 62 indicating whether a corresponding door 12, 14 is open or closed.

The transmission position sensor 64 may be in communication with the controller 60. The transmission position sensor 64 is programmed to detect whether a transmission (not shown) is engaged in a park gear. In a park gear, the transmission prevents movement of the vehicle 10, e.g., by locking wheels of the vehicle 10. The transmission position sensor 64 may be, for example, a sensor, e.g., a voltmeter, ammeter, ohmmeter, etc., that registers a value of an electrical variable, e.g., voltage, current, resistance, etc., in an electrical circuit that includes circuit elements in the transmission. Values of the electrical variable corresponding to an open circuit may be classified as the transmission being engaged in the park gear, and values of the electrical variable corresponding to a closed circuit may be classified as the transmission being engaged in another gear, e.g., a drive gear, a reverse gear, etc. The controller 60 may receive on or more signals from the transmission position sensor 64 indicating whether the transmission is engaged in a park gear or another gear.

The controller 60 may be a microprocessor-based computing device implemented via circuits, chips, or other electronic components. The controller 60 may include a processor, memory, etc. The memory of the controller 60 may store instructions executable by the processor and the processor may read the instructions from the memory and execute the instructions.

The control system 58 may transmit signals through the communications network 66 such as a controller area network (CAN) bus, Ethernet, Local Interconnect Network (LIN), and/or by any other wired or wireless communications network.

The controller 60 may be programmed to activate the linear actuator 26 in response to detecting that front door 12 and the rear door 14 are closed. For example, in response to receiving the signals from the door sensors 62, the controller 60 may initiate activation of the linear actuator 26. In other words, when the door sensors 62 detect the front and rear doors 12, 14 are closed, the controller 60 may send a signal to activate the linear actuator 26. Specifically, the controller 60 may activate the linear actuator 26 to engage the other of the first bracket 18 or the second bracket 20. Conversely, the controller 60 may activate the linear actuator 26 to disengage the other of the first bracket 18 or the second bracket 20 in response to detecting that one of the front or rear doors 12, 14 are open, e.g., the latching assembly 56 between the doors 12, 14 is disengaged. In examples in which the reinforcement system 16 includes a second linear actuator 68, the controller 60 may control actuation of the second linear actuator 68 in substantially the same manner.

Additionally, or alternatively, the controller 60 may be programmed to activate the linear actuator 26 in response to detecting that the transmission is engaged in the park gear. For example, in response to receiving the signals from the transmission position sensor 64, the controller 60 may initiate activation of the linear actuator 26. In other words, when the transmission position sensor 64 detects the transmission is engaged in the park gear, the controller 60 may send a signal to activate the linear actuator 26. Specifically, the controller 60 may activate the linear actuator 26 to disengage the other of the first bracket 18 or the second bracket 20. Conversely, the controller 60 may activate the linear actuator 26 to engage the other of the first bracket 18 or the second bracket 20 in response to detecting that the transmission is engaged in another gear, e.g., a drive gear, a reverse gear, etc. In examples in which the reinforcement system 16 includes a second linear actuator 68, the controller 60 may control actuation of the second linear actuator 68 in substantially the same manner.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. The adjectives "first," "second," etc., are used herein as identifiers and are not used to indicate order or importance. Many modifications and variations of the present disclosure are possible in light of the above teachings, and the disclosure may be practiced otherwise than as specifically described.

What is claimed is:

1. A vehicle, comprising:
a front door and a rear door;
a first bracket fixed to the front door and a second bracket fixed to the rear door;
a front cable extending from the first bracket away from the second bracket along a vehicle-longitudinal axis;
a rear cable extending from the second bracket away from the first bracket along the vehicle-longitudinal axis; and
a linear actuator fixed to one of the first bracket or the second bracket and being extendable to the other of the first bracket or the second bracket.

2. The vehicle of claim 1, wherein the linear actuator is configured to threadedly engage the other of the first bracket or the second bracket.

3. The vehicle of claim 2, wherein, when the linear actuator is engaged with the other of the first bracket or the second bracket, the front cable and the rear cable are under tension.

4. The vehicle of claim 2, wherein, when the linear actuator is disengaged with the other of the first bracket or the second bracket, tension in the front cable and/or the rear cable is relaxed relative to the tension when the linear actuator is engaged with the other of the first bracket or the second bracket.

5. The vehicle of claim 1, further comprising a computer having a processor and a memory storing instructions executable by the processor to control actuation of the linear actuator based on determining whether at least one of the front door or the rear door is open.

6. The vehicle of claim 5, wherein the instructions further include instructions to control actuation of the linear actuator additionally based on determining whether a transmission is engaged in a park gear.

7. The vehicle of claim 1, wherein the linear actuator is positioned to extend along an axis generally parallel to the vehicle-longitudinal axis.

8. The vehicle of claim 1, wherein the front cable extends across the front door, and the rear cable extends across the rear door.

9. The vehicle of claim 1, wherein the front door includes a front hinge spaced from the first bracket and the rear door includes a rear hinge spaced from the second bracket, the front cable being connected to the first bracket and the front hinge, and the rear cable being connected to the second bracket and the rear hinge.

10. The vehicle of claim 9, wherein the front hinge and the first bracket are generally aligned with each other along a vertical axis, and the rear hinge and the second bracket are generally aligned with each other along the vertical axis.

11. The vehicle of claim 10, wherein the first bracket and the second bracket are generally aligned with each other along the vertical axis.

12. The vehicle of claim 1, wherein the front cable and the rear cable are generally parallel to each other.

13. The vehicle of claim 1, further comprising:
a third bracket fixed to the front door and spaced from the first bracket along a vertical axis;
a fourth bracket fixed to the rear door and spaced from the second bracket along the vertical axis;
a lower front cable extending from the third bracket away from the fourth bracket along the vehicle-longitudinal axis;
a lower rear cable extending from the fourth bracket away from the third bracket along the vehicle-longitudinal axis; and
a second linear actuator fixed to one of the third bracket or the fourth bracket and being extendable to the other of the third bracket or the fourth bracket.

14. The vehicle of claim 13, wherein the front cable and the lower front cable are generally parallel to each other, and the rear cable and the lower rear cable are generally parallel to each other.

15. The vehicle of claim 14, wherein the front cable and the rear cable are generally parallel to each other.

16. The vehicle of claim 13, further comprising a front reinforcement cable extending from the front cable to the lower front cable and a rear reinforcement cable extending from the rear cable to the lower rear cable.

17. The vehicle of claim 16, wherein the front reinforcement cable extends oblique to the front cable and the lower front cable, and the rear reinforcement cable extends oblique to the rear cable and the lower rear cable.

18. The vehicle of claim 13, wherein the front door includes front hinges, and the rear door includes rear hinges, the front cable and the lower front cable each being connected to one respective front hinge, and the rear cable and the lower rear cable each being connected to one respective rear hinge.

19. The vehicle of claim 13, wherein the front cable and the lower front cable both extend across the front door, and the rear cable and the lower rear cable both extend across the rear door.

20. The vehicle of claim 13, wherein the linear actuator is positioned to be extendable along an axis generally parallel to the vehicle-longitudinal axis, and the second linear actuator is positioned to be extendable along a second axis generally parallel to the vehicle-longitudinal axis.

* * * * *